(12) United States Patent
Van Der Tol et al.

(10) Patent No.: US 8,567,344 B2
(45) Date of Patent: Oct. 29, 2013

(54) METHOD OF AND DEVICE FOR MILKING A DAIRY ANIMAL DEPENDENT ON THE LACTATION PERIODS

(75) Inventors: Patrick Philip Jacob Van Der Tol, Amersfoort (NL); Leendert Kool, Stolwijk (NL)

(73) Assignee: Lely Patent N.V., Maassluis (NL)

( * ) Notice: Subject to any disclaimer, the term of this patent is extended or adjusted under 35 U.S.C. 154(b) by 21 days.

(21) Appl. No.: 13/157,331

(22) Filed: Jun. 10, 2011

(65) Prior Publication Data

US 2011/0232576 A1   Sep. 29, 2011

Related U.S. Application Data

(63) Continuation of application No. PCT/NL2009/000242, filed on Dec. 1, 2009.

(30) Foreign Application Priority Data

Dec. 10, 2008 (NL) ..................................... 1036300

(51) Int. Cl.
*A01J 3/00* (2006.01)
(52) U.S. Cl.
USPC ..................................................... 119/14.02
(58) Field of Classification Search
USPC ..................................................... 119/14.02
See application file for complete search history.

(56) References Cited

U.S. PATENT DOCUMENTS

| 4,190,021 | A | * | 2/1980 | Reisgies ..................... 119/14.44 |
| 4,790,261 | A | * | 12/1988 | Wartenhorst ............... 119/14.02 |
| 5,769,024 | A | * | 6/1998 | Ornerfors et al. ........... 119/14.02 |
| 5,771,837 | A |   | 6/1998 | van der Lely |
| 5,979,358 | A | * | 11/1999 | Ornerfors et al. ........... 119/14.02 |
| 7,258,074 | B2 | * | 8/2007 | Ebeling et al. ............... 119/14.02 |
| 2003/0111017 | A1 | * | 6/2003 | Wartenhorst ............... 119/14.02 |

FOREIGN PATENT DOCUMENTS

| DE | 10 2007 002347 A1 | 7/2008 |
| WO | 9925176 A | 5/1999 |
| WO | 2004/100650 A | 11/2004 |

OTHER PUBLICATIONS

International Search Report and Written Opinion relating to PCT/NL2009/000242 issued Mar. 19, 2011.
NL Search Report relating to NL 1036300 issued Jul. 24, 2009.

* cited by examiner

*Primary Examiner* — Yvonne Abbott
(74) *Attorney, Agent, or Firm* — Hoyng Monegier LLP; Coraline J. Haitjema; David P. Owen

(57) ABSTRACT

The invention provides a milking device having at least one teat cup connectable to a teat of a dairy animal, and a method of controlling the milking device. A measuring sensor measures the amount of milk secreted. Data regarding the dairy animal are collected in a control unit. The method includes the steps of: providing a milking frequency determined in a first manner at a first lactation phase and a milking frequency determined in a second, different manner at a later, second lactation phase, for example, the stimulation phase and the stable phase, respectively, wherein the first manner results in a higher milking frequency than the second manner in the same circumstances; identifying a dairy animal and determining the associated milking frequency; milking the dairy animal dependent on the milking frequency; determining the milk production; and switching from the first to the second lactation phase, dependent on the milk production.

20 Claims, 4 Drawing Sheets

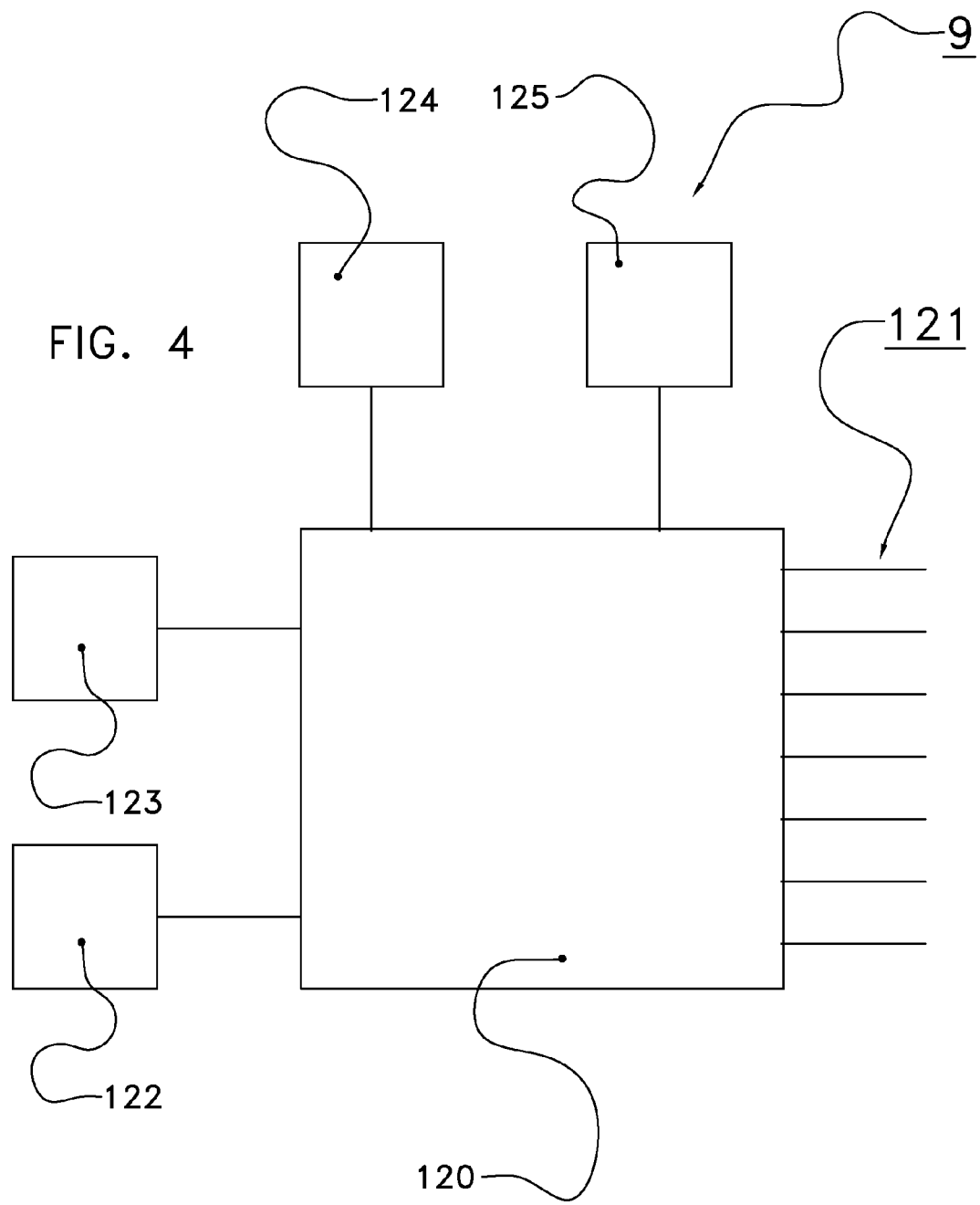

METHOD OF AND DEVICE FOR MILKING A DAIRY ANIMAL DEPENDENT ON THE LACTATION PERIODS

CROSS REFERENCE TO RELATED APPLICATIONS

This application is a continuation of PCT patent application number PCT/NL2009/000242 filed on 12 Jan. 2009, which claims priority from the Netherlands patent application number NL 1036300, filed 10 Dec. 2008. Both applications are hereby incorporated by reference in their entirety.

BACKGROUND OF THE INVENTION

1. Field of the Invention

The invention relates to a method of controlling a milking device. The invention also relates to a milking device.

2. Description of the Related Art

It is known to provide a milking device that comprises a milking unit which is provided with at least one teat cup which is capable of being connected to a teat of a dairy animal, and to milk said dairy animal by means thereof. The milking can be highly automated, for example by means of a robot. The dairy animal can be milked according to a scheme. A farmer can milk his dairy animals at fixed times. In a milking robot milking can take place by allowing a dairy animal access to the robot according to a predetermined setting.

BRIEF SUMMARY OF THE INVENTION

In the present application, the scheme or the setting for allowing the milking of the dairy animal is designated by milking frequency. The milking frequency may be an integer number of milkings per unit of time, but may also comprise a more irregular scheme. An admission criterion can allow one or more milkings daily and thus determines the milking frequency. Milking frequency according to this invention comprises all equivalents of the term admission criterion and other variants thereof. On the basis of the milking frequency the admission of the dairy animal to the automatic milking device can be controlled, or a signal that milking of the animal is desired can be supplied to, for example, the farmer. The invention is not limited to a specific sort of automatic or semi-automatic milking device.

It is known that the admission criterion or the milking frequency of dairy animals can depend on the lactation stage of the dairy animal and/or the production level. For each lactation stage a number of milkings daily can be set.

The stimulation phase and the stable phase may form part of a lactation period of a cow. In the stimulation phase, usually at the beginning of the lactation period, the milking is stimulated owing to the milking frequency being relatively high. The milking frequency in this phase is at least higher than would be required at the same milk production in the stable phase. In the stable phase, a dairy animal is milked according to its milk production. In the stable phase, the milk production and milking frequency are more attuned to each other.

The stable phase is a phase which, over time, is situated at least after the stimulation phase and is a phase in which the milking frequency at equal parameters is in principle lower than the milking frequency at the same parameters in the stimulation phase.

At the beginning of a lactation period a dairy animal will "grow in milk", in which case the milk production will increase to a maximum, and it is advantageous to reach this maximum as quickly as possible. This is achieved by allowing a relatively high/a higher number of milkings.

After a dairy animal has reached its maximum milk production, the milk production will gradually decrease, until the end of the lactation period has been reached. Reaching a maximum is stimulated in the stimulation phase. It will be obvious that the milk production of a dairy animal depends on a large number of factors and that, as a result thereof, the actual milk production has unpredictable irregularities, so that it is difficult for algorithmic analyses, in particular during the lactation period, when future data for milk production are obviously not yet available, to recognize the different phases, which forms in particular a problem upon switching from a stimulation phase to the stable phase.

The invention relates in particular to the transition from a first lactation phase, such as the stimulation phase, to a second lactation phase, situated later in time, such as the stable phase, but can also be applied in other situations in which a plurality of phases in a lactation period are indicated. A plurality of such periods are, for example, mentioned in WO 99/25176, which is incorporated by reference in its entirety.

One of the problems in the prior art is determining a transition of lactation phases, switching from a first to a second phase, such as from a stimulation phase to a stable phase, for a dairy animal, as illustrated in what follows. The present state of the art only allows either to determine beforehand a switching moment that is invariable in time, or to determine a switching moment afterwards.

It is, therefore, an object of the present invention to achieve an improved switching between lactation phases and thus to have the switching moment take place closer to the actual moment of said transition of the individual dairy animals. In one embodiment, the invention relates to an improved determination of the switching moment. In one embodiment, the invention relates to an improved way of determining a milking frequency of a dairy animal in dependence on the lactation phase and, thus, in dependence on the switching moment of the phases.

According to an aspect of the present invention, one object is achieved in that there is provided a method of controlling a milking device, which comprises a milking unit which is provided with at least one teat cup that is connectable to a teat of a dairy animal. By means of this a dairy animal can be milked. Milk can be received in the teat cups and be collected further downstream.

The method preferably comprises providing a milking frequency determined in a first manner, associated with a first lactation phase, such as the stimulation phase, and providing a second milking frequency determined in another manner, associated with a second, later, lactation phase, such as the stable phase, wherein the two lactation phases form part of the lactation period of a dairy animal, wherein said first manner results in principle in a higher milking frequency in the same circumstances, based on the same parameters. This makes it possible to use for each lactation phase its own algorithm. A person skilled in the art will in each case apply the most suitable algorithm for the lactation phase in question. The algorithm may, for example, be attuned to the kind of dairy animal and/or the age of the dairy animal.

A dairy animal will, in general, be milked more frequently in an earlier lactation phase, such as the stimulation phase, than in a later phase, such as the stable phase. This applies at least to a constant milk production, with a view to stimulate that production. Since such data can also be used when calculating the milking frequency, it is possible that, in the case of an actual calculation, the milking frequency in the stimulation phase turns out to be lower than the milking frequency in a stable phase.

The method according to the invention preferably further comprises identifying a dairy animal and determining the milking frequency associated with the identified dairy animal. Identifying the dairy animal allows to determine an individualized milking frequency for that dairy animal. The milking frequency can be retrieved from a memory. Additionally, said milking frequency may depend on the current lactation phase of the dairy animal is. The current lactation phase of the dairy may also be stored by means of a parameter in a memory and be retrieved therefrom.

The method preferably further comprises milking the identified dairy animal with the milking unit in dependence on the determined milking frequency. This milking can be brought by means of a signal to the attention of a farmer who will start the milking, or can take place in an automated manner in that the dairy animal is allowed access to the milking unit, after which the teat cup is connected to the teats of the dairy animal and the milking can start.

The method preferably further comprises determining the milk production of the dairy animal. Determination of the milk production can take place during the milking, or can be carried out after the milking has been finished. Determination of the milk production can take place in different manners. An instantaneous measurement can be carried out, or weighing of the total collected milk production can take place. The milk production can be expressed in different units and can be calculated for different steps, for example per milking or per production day. The milk production is recorded. The determined milk production of a dairy animal can be stored. Historical data of a dairy animal can thus be built up.

The method according to the invention preferably comprises switching from the first lactation phase, such as the stimulation phase, to the second lactation phase, such as the stable phase, this switching taking place in dependence on said determined milk production of the dairy animal. The transition of phases will result in the milking frequency being determined in another manner, in which case the milking frequency will in general decrease, in particular at the same milk production. Contrary to the state of the art, for this switching is not selected a fixed moment, for example a predetermined number of days for each dairy animal, but this switching is done in dependence on the determined milk production. This makes it possible to obtain for each dairy animal an optimum period for stimulation, or anyhow to improve therein, because it is possible to take individual milk production parameters of the identified dairy animals into account. Due to the fact that switching from the stimulation phase to, for example, the stable phase is better attuned to the individual dairy animals, on the one hand, disease symptoms with dairy animals, for example excessive stimulation, will be counteracted and, on the other hand, the milking device will be used more efficiently. These two factors result in a large economical difference for the user.

In one embodiment, the milking frequency for the stimulation phase and the stable phase is calculated in dependence on the determined milk production. The milking frequency is preferably calculated on the basis of data regarding the dairy animal, such as milk production data, historical data, etcetera. This allows a person skilled in the art to select an even more suitable algorithm. As a result thereof, the data for the milk production are used in two manners to improve the efficiency of the milking.

Switching between lactation phases and/or calculating the milking frequency can depend on the daily production of the dairy animal. Switching and/or calculating in dependence on the daily production results in using a parameter in which some averaging has taken place, i.e. for that day's milkings. By taking the daily production into account, a more or less stable period is taken as a result of which great fluctuations in the milk production are averaged.

Preferably, the method comprises forming a parameter representative of the milk production of the identified dairy animal, and switching from the stimulation phase to the stable phase on the basis of said parameter. The parameter may be a parameter derived from the milk production, such as an averaged value or a filtered value, which parameter can be used for carrying out calculations, for example in a processor of a calculation unit, such as a central calculation unit of a computer. Moreover, the formed parameter can be stored in a memory, so that historical data are gathered and can be retrieved for future milkings. The parameter can in particular represent a value of a plurality of milkings, for example a daily production.

It is particularly preferable to form a parameter that is representative of the progressive daily average of the milk production of the identified dairy animals. Extensive experimental research by the inventor has demonstrated that the progressive daily average is a particularly favourable parameter on which decisions for switching from the stimulation phase to the stable phase can be based.

According to one embodiment, the method furthermore comprises providing a threshold value and switching from stimulation phase to stable phase in dependence on whether said threshold value is reached by means of the parameter. The threshold value can be provided as a predetermined value, which is stored in a memory, or can be set in another manner. The switching moment for the transition from stimulation to stable can be determined hereby in an accurate manner.

In one embodiment, the threshold value and/or the parameter are/is representative of a time-derivative value of the milk production. A time-derivative value of the milk production is a change such as an increase or decrease of the milk production, and according to this preferred embodiment the increase or decrease of the time-derivative parameter can be compared with a threshold and when, for example, the time-derivative parameter falls below a certain threshold value, the switching can take place. It is particularly preferable to provide a threshold value that relates to an increase in the progressive average of the milk production and to make the switching dependent on a threshold value which, for example, amounts to a milk production increase of 0.1 liter for that day. When the time-derivative parameter falls below said threshold, the switching can take place. After extensive examination of experimental values for a plurality of dairy animals, in particular dairy cows, this way of switching has been found by the inventor as a proper method of approach.

If the actual milk production per milk yield is used as a basic data for a dairy animal and said data is averaged in order to remove the influence of all sorts of variations on the milk yield, it is possible to obtain, for example, a polynomial approach of the milk production, said milk production having a maximum. This will be elucidated below with reference to FIG. 2. According to a favourable approach, the switching from stimulation to stable phase would preferably take place at this maximum. According to the inventors, this switching moment can be approached by the milk yield increase falling below the threshold value of 0.1 liter per milking for the progressive average of that dairy animal. It is particularly surprising that the progressive average can be used to determine the switching moment.

It is further advantageous to store a parameter representative of the milk production in connection with an identification of the dairy animal and to make it available for future use. As a result thereof, the data representative of the milk production will be available at subsequent milkings.

It is in particular advantageous to make the switching dependent on a condition which should be met during a number of, preferably successive, milkings. This results in that the switching will only take place if, for example, during five successive milkings, a specific algorithm is met. In the specific example of a progressive average, the increase can be below the threshold value for a number of successive milkings/days, and only in that case the switching will take place. In another embodiment, it will be possible for the milk yield to be below a certain milk yield threshold in, for example, five successive milkings, and this can be sufficient for the switching. In one embodiment, there is used an auxiliary parameter, for example stored in a memory, indicating the number of successive milkings in which the switching condition has been met.

It is further advantageous to provide a second threshold value and to prevent the switching in dependence on said second threshold value and a parameter representative of the milk production. In particular, the switching is prevented in dependence on the second threshold value which is representative of an increase/decrease of the determined milk production and a time-derivative of a parameter representative of the milk production for the identified dairy animal. If the increase/decrease is larger than the second threshold value, the switching is prevented. In a case of mastitis, a fall in the milk production may occur. If there is a fall in milk production or a parameter derived therefrom, in particular the progressive average daily production, there is a too sudden change in the milk production and the switching will be prevented. In a particular embodiment, as a result of the too sudden fall, it will be possible to prevent the switching during a longer period of time, for example during a week.

In one embodiment, a fall of the progressive daily production during a running time of the method can in each case result in preventing the switching. If the switching only takes place if, during for example five days in succession, the growth is smaller than a determined first threshold, it is in each case possible to test whether the growth is at least larger than a second threshold value, for example greater than zero, in which case missing of the second threshold value results in each case in delay of switching.

According to another aspect of the present invention, there is provided a milking device which comprises a milking unit which is provided with at least one teat cup and with a connecting unit for, preferably automatically, connecting the teat cup to a teat of a dairy animal. Preferably, the milking device further comprises a measuring sensor which issues a measurement signal representative of the milk production. Preferably, the milking device further comprises an identification unit for enabling the identification of an individual dairy animal, and a control unit, wherein the control unit is connected to the measuring sensor and the identification unit, and wherein the control unit is configured to determine a milking frequency in a first manner, associated with a stimulation phase, and/or a second, different manner, associated with a stable phase, wherein the stimulation phase and the stable phase form part of the lactation period of the dairy animal. The first manner results substantially in a higher milking frequency than the second manner of determining the milking frequency. The control unit is preferably configured to milk the identified dairy animal with the milking unit in dependence on the determined milking frequency associated with the identified dairy animal. Preferably, the control unit is further configured to switch from stimulation phase to stable phase for the identified dairy animal in dependence on the measurement signal for the milk production of the dairy animal received from the measuring sensor. As a result thereof, the switching from the stimulation phase to the stable phase becomes dependent on the milk production and thus dependent on the property of the identified dairy animal. The control unit may comprise a memory in which for each dairy animal to be identified the current phase of the dairy animal is indicated, it being possible to update this memory in dependence on the milk production of the dairy animal. By the switching according to the invention, there is obtained in a dynamic manner a transition from stimulation to stable phase for each dairy animal, as a result of which no superfluous stimulation will take place, the dairy animal will be allowed less frequently to visit the milking device and the milking device will thus be used more efficiently, and the determination of the transition moment can be carried out more accurately and in an individualized manner for the dairy animals.

Preferably, the control unit is configured to calculate the milking frequency. Preferably, the information from the measuring sensor is used for the calculation.

The moment of switching the phases, but also the determination of the milking frequency can be further improved in that the control unit is configured to determine a change in the milk production or a parameter derived from the milk production of the identified animal, and wherein said control unit is configured to make the switching of the phases and/or the calculation of the milking frequency for the identified dairy animal dependent on that calculation. The inventor has made long research on the milking data of dairy animals and has surprisingly established that a better determination of the moment of switching from stimulation to stable phase is possible in dependence on the change in the milk production. If the switching from stimulation to stable is calculated on the basis of an algorithm, the algorithm according to this embodiment comprises using the change, thus the time-derivative, of the measurement signal that is representative of the milk production.

In a further embodiment, the control unit is connected to a memory in which a first threshold value is stored and wherein said control unit is further configured to switch from stimulation to stable phase for the identified dairy animal in dependence on the threshold value from the memory. On the basis of the analysis of experimental data of dairy animals, the inventor has been able to establish that a comparison with a first threshold value of the measurement signal or a derivative thereof with a specific threshold results in an improved switching moment. The change in milk production is preferably a change per predetermined unit of time, and the first threshold preferably too. The unit of time may, for example, be a daily production. As a result thereof, a change per a number of milkings will be taken, so that a certain reduction of the measured milkings takes place.

In a further preferred embodiment, the control unit preferably uses a parameter that corresponds to the progressive average production and in particular the progressive average daily production. In a particular preferred embodiment, a change in the progressive daily average is used, which parameter is obtained in dependence on the received measurement signal, and the change in the progressive average daily production is compared with a first threshold which is configured for this purpose and which is obtained from a memory. Such a device results in a favourable determination of the moment of transition to the stable phase. From research it has been found that determining the most effective switching moment is possible by means of the progressive average.

In a preferred embodiment, there is provided a milking device in which the connecting unit is mounted on a robot arm. This results in an automatic milking device which is able to milk dairy animals without human intervention. On the basis of the milking frequency the access to the milking device is controlled.

In a preferred embodiment, the milking device comprises a memory in which milking data based on the milk production are stored in connection with an identification for the identified dairy animal. As a result thereof, milking data of a dairy animal are gathered, on the basis of which the control unit is able to determine, for example, a frequency and/or the moment of the transition from stimulation phase to stable phase.

In a further preferred embodiment, the milking device has an animal space which is provided with a controllable access connected to the control unit, the access being controlled in dependence on the determined milking frequency of the identified animal.

In a preferred embodiment, it is possible to store a parameter representative of the milk production in connection with an identification of the dairy animal in a memory. As a result thereof, earlier data are known and usable.

In one embodiment, the control unit is furthermore configured to prevent the switching from stimulation to stable phase in dependence on a specific increase or decrease of the milk production of the dairy animal, and in particular in dependence on a difference between the determined milk production and an earlier stored milk production for the identified dairy animal. If the difference, in particular in the case of a decrease of the milk production, between an old milking and a current milking is too great, there is a possibility of the dairy animal being ill as a result of which the milk production has considerably decreased, and the switching can be prevented on the basis of this difference. In this embodiment, the algorithm for determining a switching moment provides a number of conditions under which switching does not take place. When these conditions occur, the switching, independently of other parameters, will not take place. In particular, averaging of the to be compared parameters takes place. This prevents a decrease in the milk production due to natural causes from not resulting in preventing the switching.

In a further preferred embodiment, a second threshold value is stored in a memory and the control unit is configured to prevent the switching if the mentioned difference in the milk production or the time-derivative of the parameter representative of the milk production is greater than said second threshold value. Said second threshold value may, for example, be a milk production decrease for a specific period of time. The stored milk production by means of which a difference is determined is the milk production within a unit of time which is equal or substantially equal to the determined unit of time for the current measurement.

It is further possible also to store, in connection with the integration of the dairy animal and the representative parameter, a moment of time in the memory, so that it is possible to establish when that milking with those results took place.

The invention will be described on the basis of a number of embodiments. However, it will be clear for a person skilled in the art that the invention is not limited to the described embodiments and that a plurality of variants are possible.

Although the invention is described on the basis of a number of advantages, a number of elements mentioned in this description comprise other advantages.

BRIEF DESCRIPTION OF THE DRAWINGS

The invention will be described in further detail with reference to the attached drawing, in which:

FIG. 4 is an embodiment of a control unit according to an embodiment of the invention.

DESCRIPTION OF ILLUSTRATIVE EMBODIMENTS

Figure 1:
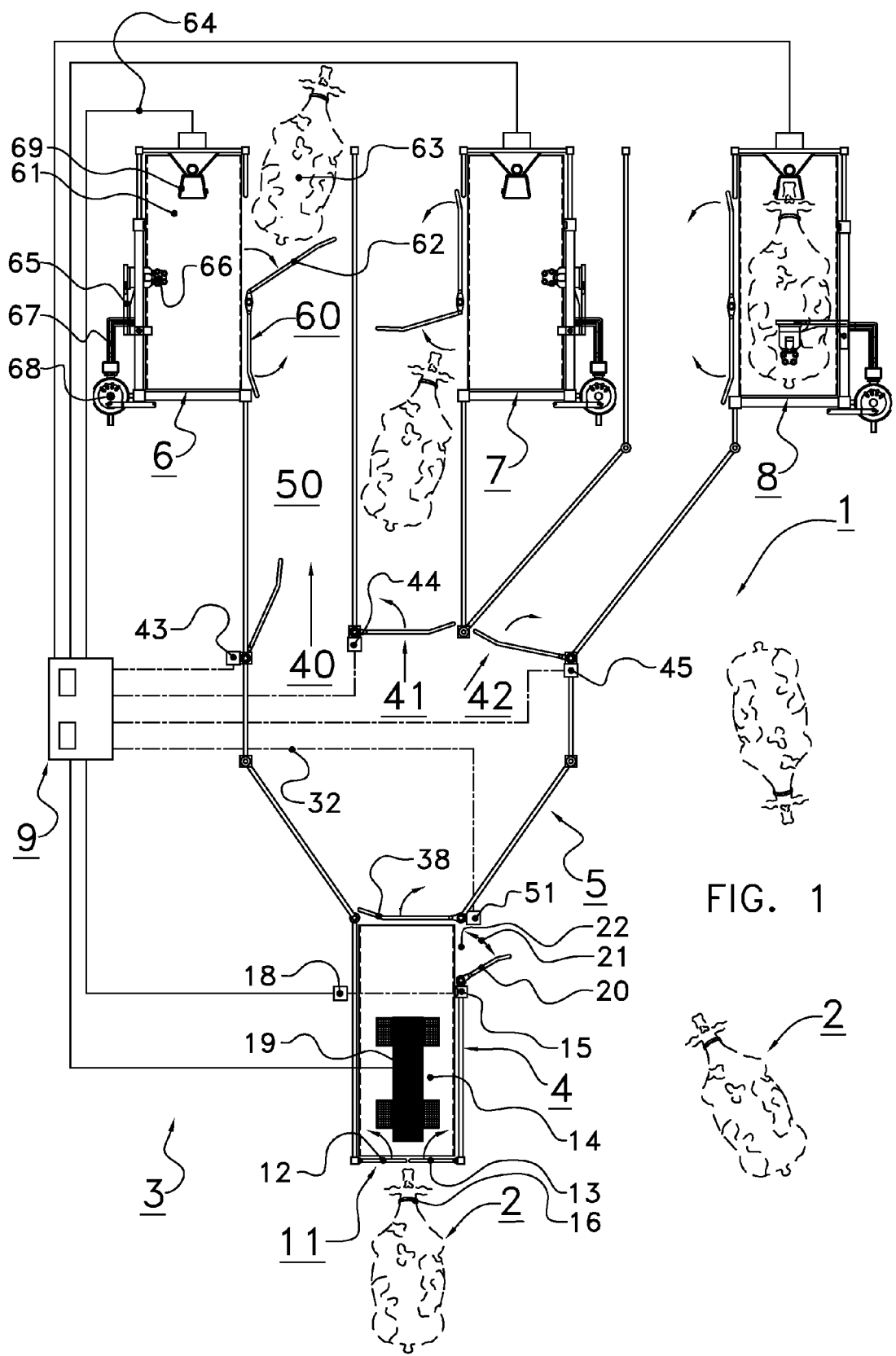
FIG. 1 is a top view of an embodiment of a part of a dairy animal accommodation according to a first embodiment.

The following is a description of certain embodiments of the invention, given by way of example only and with reference to the drawings. FIG. 1 shows an embodiment of a part of an accommodation 1 for dairy animals. The dairy animals in FIG. 1 are depicted as cows 2. The accommodation for dairy animals 1 may be equipped by means of different modules and may comprise, in one embodiment, at least one module for milking dairy animals, such as a milking device 3. From the accommodation space it is possible for a dairy animal 2 to move and to walk towards the dairy animal milking device 3. In the accommodation 1 and the milking device 3 there may be implemented stimuli for moving the dairy animal 2 to the milking device, for example because certain nutrients for the dairy animal 2 are only dispensed in the milking device 3. The milking device 3 may be included in the same space as the accommodation 1, or may be disposed in a space connected thereto.

In the embodiment shown according to FIG. 1, the milking device 3 comprises a reporting module 4, a connecting part 5, and at least partly automated milking robots 6-8. The milking device 3 further comprises a control unit 9. The control unit 9 may be connected electrically or wirelessly to controllable components of the milking device 3 or to measuring units of the milking device 3. Information can be gathered via the measuring units in the control unit 9 by means of which the controllable components of the milking device can subsequently be controlled. The control unit 9 will be set out in further detail with reference to FIG. 4.

A dairy animal 2 can reach the reporting module 4 from the accommodation 1. The reporting module 4 has an entrance 11 which comprises two doors 12 and 13 that can be opened by pivoting outwardly or inwardly. By opening the entrance 11, dairy animal 2 will be allowed access to the internal space 14 of the reporting module 4. Various other embodiments are possible. A person skilled in the art will in each case be able to select an efficient embodiment.

In the internal space 14 there are a number of measuring sensors for measuring a number of properties of a dairy animal 2. In the embodiment shown according to FIG. 1, a first measuring sensor 15 is configured to identify a dairy animal 2. Dairy animal 2 may be provided with a collar identification 16, an implanted identification or another measurable identification carrier that can be measured by measuring sensor 15 and by means of which the identification of dairy animal 2 can take place. In one case, a parameter that is representative of the identification of dairy animal 2 is measured by measuring sensors 15, which parameter can be sent to the control unit 9 via an electronic or wireless connection. The control unit thus receives information about the presence of a certain dairy animal 2 at the entrance to the milking device 3.

In a further embodiment, there may be provided a plurality of measuring units 18 and 19 in or near the internal space 14 of reporting module 4, which are connected to control unit 9 for measuring further properties of dairy animal 2. Measuring sensor 19 may be configured to measure weight properties of dairy animal 2 or other dimensions of dairy animal 2. The measured data can be sent, integrally or in processed form, to control unit 9. Various measuring units for measuring the desired properties of the dairy animal 2 will be known to a person skilled in the art. The measured data or processed data can be connected to the identification of dairy animal 2 measured by the identification sensor 15. The data can be stored in a memory, together with the identification. As a result thereof, there are obtained historical data regarding a dairy animal 2, which data are connected to its identification. Such data can be used for analysing the behaviour of dairy animal 2 and/or for controlling the feeding of the dairy animal or other properties that are important for the dairy animal.

In control unit 9 there is determined a milking frequency indicating for a dairy animal how frequently a dairy animal can or may be milked. The milking frequency may indicate a number of daily milkings or may be configured as a time clock by means of which the interval between a previous milking and the instantaneous point of time is measured, which intervals should have a specific magnitude in dependence on the milking frequency. Combinations thereof are also possible. In one embodiment, a certain dairy animal 2 has a milking frequency of four, i.e. in one embodiment, four daily milkings. In one embodiment, four daily milkings may result in that a dairy animal can again be allowed access to the milking device 3 five hours after a previous milking has taken place. Various settings in which an interval or an admission criterion can be used for allowing or not allowing a dairy animal 2 to be milked will be known to a person skilled in the art.

It is possible for the identified dairy animal 2 which has arrived in reporting module 4, when it is not yet time for being milked, to be led outside the reporting module 4 via exit 22, formed by a door 20 which can move according to arrow 21 to an open position. As a result thereof, dairy animal 2 will leave the reporting module 4 and be led back to the accommodation 1 or to another module in the accommodation 1.

When the identified dairy animal 2 is recognized in reporting module 4 by control unit 9 as a dairy animal that can be allowed access to the further milking device 3, the gate 38 will be opened in that control unit 9 sends a signal suitable for the purpose via the wired or wireless connection 32 to actuator 51, by means of which gate 38 can be opened and closed. Dairy animal 2 can now be allowed access from reporting module 4 to dividing module 5, and a subsequent dairy animal can report in reporting module 4 via the entrance 11. The identified dairy animal 2 that has been allowed access to dividing module 5 will be milked. The milking frequency of the identified dairy animal was such that a previous milking took place a sufficiently long time ago and the dairy animal 2 can be milked again at that moment.

Dividing module 5 comprises three gates 40, 41, 42 which are disposed downstream from gate 38. The gates 40, 41, 42 can be actuated by means of actuators 43-45 via an electric connection by control unit 9. As a result thereof, control unit 9 is able to open and close the gates. In the embodiment shown, gate 40 is shown in the open position so that a dairy animal that has been allowed access to dividing module 5 can be allowed access to corridor 50 which leads to milking robot 6. Milking robot 7 is also empty, but a dairy animal is already on its way to this milking robot. In milking robot 8 a dairy animal is being milked at the moment shown in FIG. 1.

The identified dairy animal 2 that has been allowed access to corridor 50 can continue its way, in which case a gate 60 can be opened so that the identified dairy animal 2 is allowed access to the internal space 61 of milking robot 6. In the embodiment shown, exit gate 62 is shown in an open position and dairy animal 63 is leaving the milking robot. Dairy animal 63 can continue its way back to the accommodation 61. The gates 60 and 62 can be controlled by a control unit suitable for the purpose, such as control unit 9 which is in connection with milking robot 6 via a communication line 64.

Milking robot 6 comprises an arm 65 with a unit with teat cups 66 mounted thereon. The arm 65 can move from the position shown at milking robot 6 to the position shown at milking robot 8, in which case the teat cups 66 are positioned in the vicinity of the teats of the dairy animal 2.

Teat cups 66 can be connected to a milk collecting unit 68 via lines 67. The milk collecting unit 68 can collect the milk extracted from dairy animal 2 and measure how much milk is collected during the milking. In one embodiment, the milk obtained via the various teat cups is measured separately, so that the milk production for each teat of the dairy animal 2 can be established. In another embodiment, the milk from all teat cups is put together and, for example, the collective weight of the milk is measured in order to measure the milk production of dairy animal 2. In the context of the invention both procedures are possible.

In a milk collecting unit 68 there may be provided a measuring sensor for measuring the amount of milk. In another embodiment, there may be included in a line 67 a flow measuring sensor for measuring the milk flow obtained per teat from the dairy animal.

Milking robot 6 comprises a trough 69 in which feed can be disposed. Trough 69 is positioned in such a manner that the head of dairy animal 2 faces the trough 69 when the cow is being milked, as is visible at milking robot 8. Control unit 9 is able to control supply of feed to the trough 69. The amount of feed can be attuned to the identified dairy animal.

Figure 3:
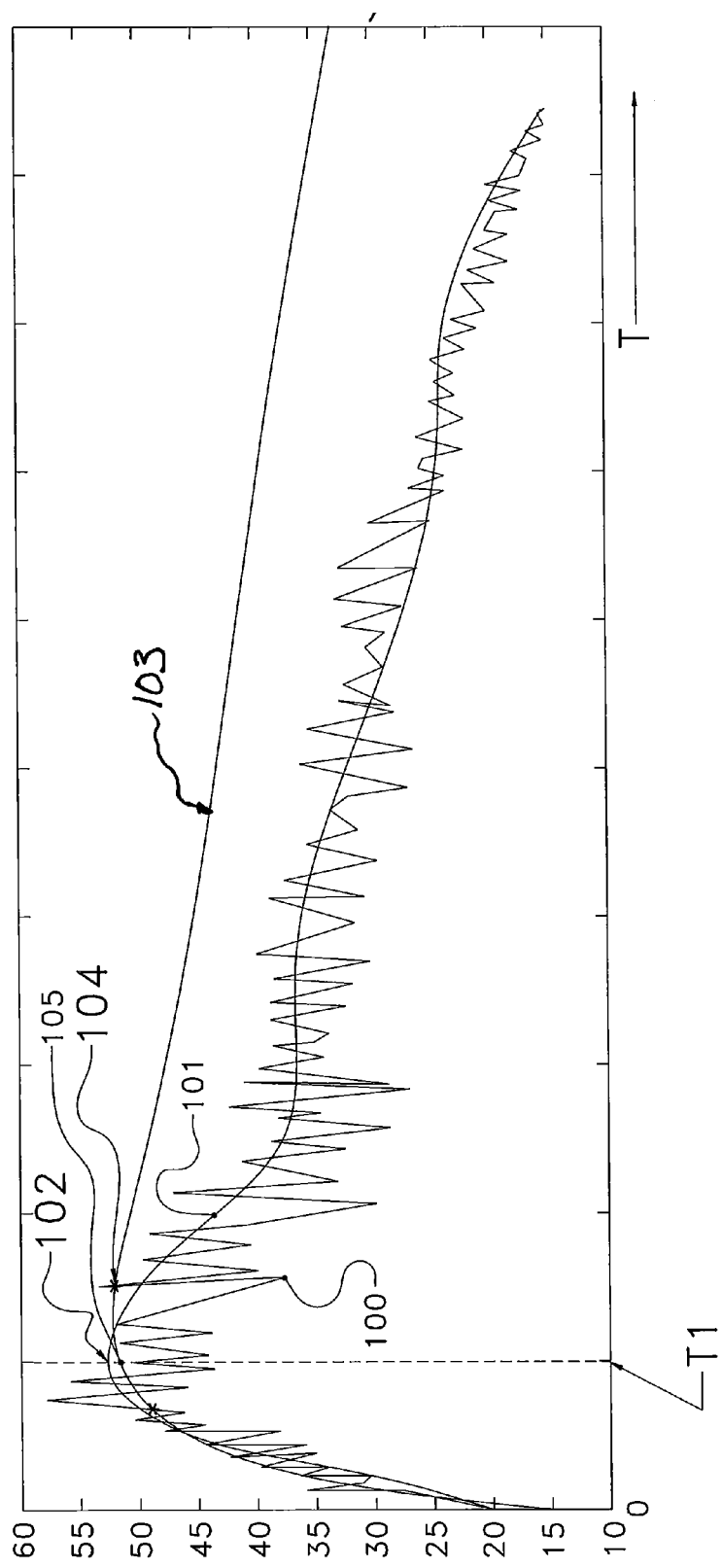
FIG. 3 is a diagram of milk production based data over time.

The milk production of the identified dairy animal in one of the milking robots 6, 7, 8 can be collected and sent via a suitable connection to the control unit 9 and be collected therein and be stored in a memory. The milk production in connection with the identification of the dairy animal can be stored in the memory so that the historical data regarding the dairy animal are collected. Such milking data are shown in FIG. 3. The irregular diagram 100 shown in FIG. 3 shows a fictitious example of milking data for an identified dairy animal which have been collected during successive milkings. The X-axis of FIG. 3 is a time scale. The time scale can be a number of days. The Y-axis of FIG. 3 is a milk production, such as the number of liters or the number of kilograms of milk produced. In FIG. 3 there is in each case taken a daily milk production as a measurement point by means of which the irregular curve 100 has been built up. For one production day the production of the number of milkings of that day is added together and this results in the daily milk production. The daily milk production is irregular and can depend on the daily circumstances.

The daily milk production according to curve 100 can be fit in a polynomial manner and this results in the curve 101 which accurately follows the actual milking data 100. It is visible that the polynomial fit 101 has designated a maximum by 102 at t1.

A number of phases can be recognized in a lactation period of a dairy animal. A lactation phase comprises a first, so-called stimulation phase and a second, so-called stable phase. Additionally, even more phases can be designated. In a stimulation phase, a relatively large number of milkings are carried out, i.e. a relatively high milking frequency, so that a dairy animal grows in milk, which results in a milk production that keeps increasing. After a maximum, such as maximum 102, has been reached, the stable phase can be designated, a second phase in the lactation period, in which the milk production decreases gradually. This can also be recognized in FIG. 3. The transition moment t1 can be designated as the afterwards determined and desired transition moment from a stimulation phase to a stable phase.

In one embodiment, the dairy animal is, for example, milked before moment 1t six times daily and after the transition only four times daily.

It is, of course, possible to identify a plurality of such phases in the lactation period. The invention relates to a transition from an earlier phase to a later phase, the situation being substantially such that in the earlier phase a higher milking frequency will be desired than in a later phase, due to the fact that in the first phase the cow is stimulated to produce more milk. However, it is possible that at the transition the milking frequency does not increase and/or that, in the later phase, a milking frequency will at a certain moment higher than in the earlier phase. This may be the result of special circumstances, such as diseases, etc.

The polynomial fit 101 is in fact an averaging of the global data 100. It will be clear that when building up the milking data at moment t1, it is not possible to produce the polynomial fit according to curve 101, since the data after moment t1 are not yet available. Therefore, it is not possible to calculate the transition moment t1 in this manner during the lactation period of the identified dairy animal 2.

Figure 2:
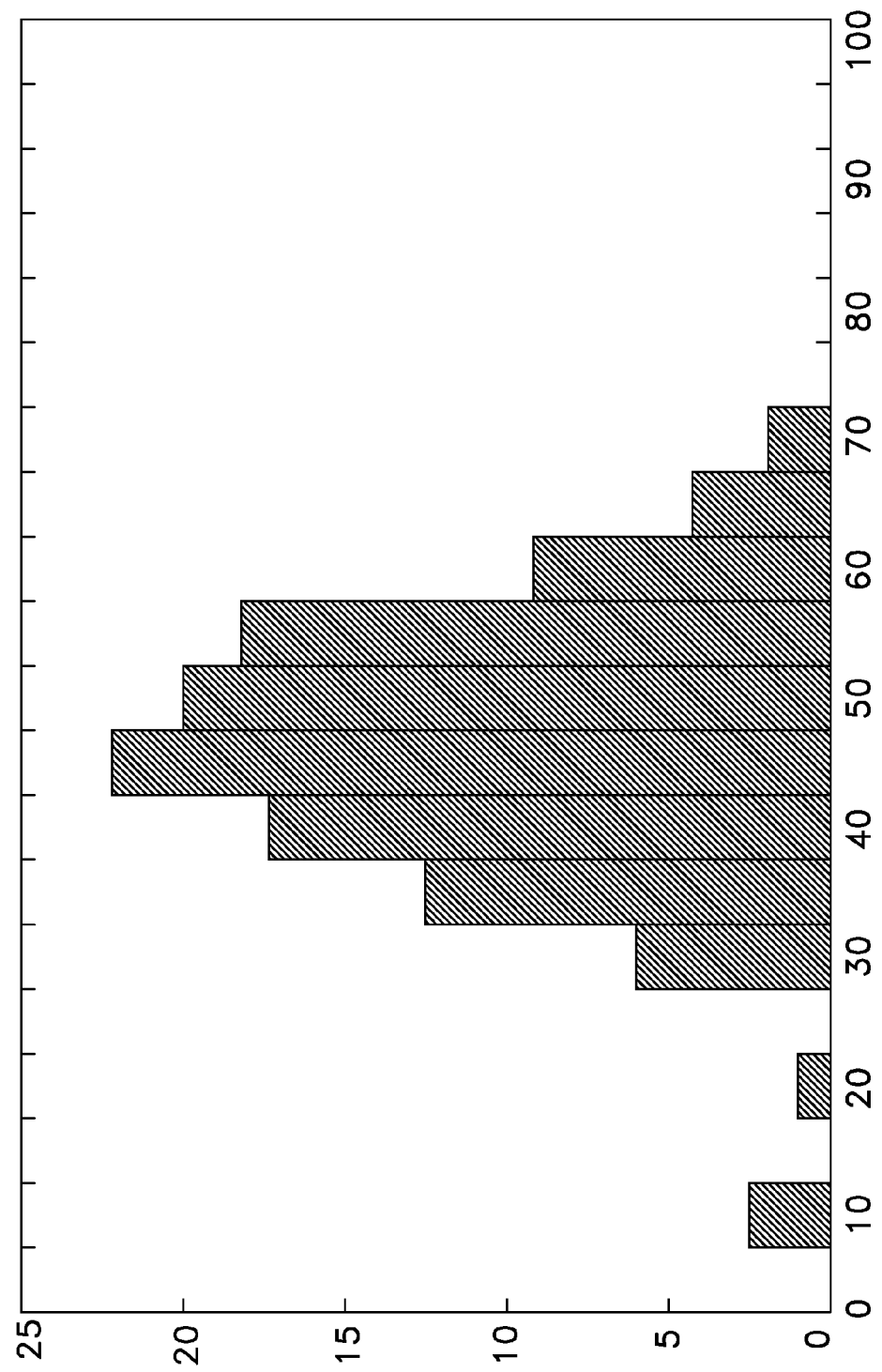
FIG. 2 is a histogram for the moment of a transition for dairy animals from a first to a second lactation period.

FIG. 2 shows a histogram for a large number of dairy animals of which the milk production has been analysed in the same manner as the milk production according to FIG. 3, and in which for each of those dairy animals a moment t1 has been identified by means of polynomial approach. Each of the transition moments, a certain number of days after the beginning of the lactation period, is shown in FIG. 2.

It is visible in FIG. 2 that this transition moment can vary strongly. Although an average transition moment is situated at around 45 days, there are a few dairy animals with which this transition moment t1 is situated at 60 to 70 days, and there are also a few dairy animals which "grow in milk" very quickly and with which the transition moment is situated at 10 or 20 days. It will be obvious that it is favourable, at least better, to select the transition moment t1 in a more flexible manner than to fix it beforehand and in an invariable manner on the basis of the average value resulting from FIG. 2. There is thus obtained a dynamic milking frequency, the milking frequency and the transition moment t1 being adapted to the milking properties of the identified dairy animal. Making the switching from a first lactation period to a second lactation period dependent on the dairy animal properties already results in a considerable improvement.

Also in the case of algorithms that are less accurate than in the preferred embodiments of the algorithm for determining the moment t1 that are described hereinafter, the effectiveness of the milking robots will be considerably improved if the switching from a first to a second lactation phase is made dependent on milking data of the momentary lactation of the identified dairy animals. Here are meant, of course: not (only) the historical milking data of earlier lactations, but, on the contrary, milking data of the momentary lactation.

In one embodiment of the invention, a determination of the transition moment is based on the milk production. Also if this determination is not optimal, a transition moment based on the milk production for that dairy animal will result in an improved efficiency of the milking device with respect to the old situation in which the transition moment is determined beforehand for each animal. For, for certain animals the stimulation phase will be maintained for an unnecessarily long period of time, wherein for a certain milk production the milking frequency, and consequently the occupation of the milking device, is relatively higher than in the stable phase.

FIG. 3 shows a curve 103 which is based on the global milking data 100 and which can be designated as a curve for the progressive average daily production of a dairy animal. The progressive milk production is the cumulative milk production of the dairy animal from moment t=0. This can be averaged by dividing it by the number of days. Curve 103 has a maximum 104 that is situated later than t1. However, it has been found from extensive analysis of milking data of a very large number of dairy animals that the moment t1 is situated at or anyhow in the vicinity of point 105 of curve 103, which point 105 is a limited increase of the average progressive milk production of the dairy animal. It has been found that an increase of the average progressive milk production 103 of dairy animal 102, which amounts to approximately 0.05-0.3 liters daily, preferably to 0.1 liter daily, is in each case situated very near to the moment t1 for each of the dairy animals, as analysed in FIG. 2, both for dairy animals that quickly grow in milk and for dairy animals that slowly grow in milk. By means of this, the inventor has established a particularly favourable criterion for switching from the first to the second phase. If the progressive average still increases by more than 0.1 liter daily, the dairy animal is still in the stimulation phase in which milking should take place relatively often. If the milk increase is lower than 0.08-0.15 liter daily, the dairy animal is near to the moment t1 at which switching is desired.

According to a preferred embodiment, this increase should be below the mentioned threshold value during a longer period of time, for example during five days. This makes it possible to take great daily fluctuations in the milk production into account.

In a preferred embodiment, in the case of an abrupt change in the average progressive milk production, preferably a decrease thereof, the switching will be blocked. This makes it possible to take into account a sudden decrease of the milk production, for example as a result of a disease of one or more of the teats of the dairy animal.

The operation of the control unit will be elucidated with reference to FIG. 4. Although FIG. 4 shows a preferred embodiment of the control unit 9, it will be clear that various embodiments are possible. For the control unit 9 there is preferably used a computer that is suitable for the purpose. With the knowledge of this description, it will be possible for a person skilled in the art to configure a computer in a suitable manner in order to control a milking device therewith according to the invention.

FIG. 4 shows the control unit 9 according to a suitable embodiment. A central calculation unit 120 is connected, via a number of connections 121, to the various actuators and measuring sensors of the milking device 3. The central calculation unit 120 is able to process data received from the measuring sensors and to convert them into control signals for the actuators and to store them in memories 122 and 123. Memory 122 can be configured to store milking data and/or other data of identified dairy animals. This may be data that can be stored in the form of a table. To the table can be added in each case data regarding the dairy animals, which data have been measured at certain points of time. These data form historical data regarding the dairy animal 2. The data can be used to calculate the progressive average daily production.

The central calculation unit 120 can add the point of time of the measurement to the data. It is possible to store data regarding settings for the milking routine in another memory 123. Algorithms that are used to determine the milking frequency for the calculation thereof can be stored therein.

The central calculation unit 120 is furthermore connected to a memory 124, 125 in which threshold values can be stored. In the first memory 124 is stored a first threshold value with which the milking data, historical milking data, or a parameter based on the milking data or historical milking data can be compared, and reaching the threshold values results in switching the lactation phase. Therefore, in memory 123 there is preferably implemented a routine for determining the progressive average milk production of a dairy animal and in memory 124 there is implemented a value of preferably 0.1 liter daily for the threshold value with which the increase of the average progressive milk production is compared. When that increase of the average progressive milk production falls below 0.1 liter daily, in memory 122 for the identified dairy animal will be recorded that it is possible to switch from the stimulation phase to the stable phase. In one embodiment, this routine is to take place during five days in succession and in each case the increase should be below 0.1 liter daily, and only after this has been the case during five successive days, actual switching will take place. Recording the lactation phase of a dairy animal can also take place in the memory 122 for data regarding dairy animals.

In the embodiment shown, the control unit 9 comprises a second memory 125 in which a second threshold value is stored. When the milk production, the average milk production, a parameter based on the milk production or average milk production or historical milking data falls below the second threshold value, the switching will be prevented. The threshold value may, for example, be a value 0 for the increase of the progressive average daily production. When the increase of the progressive average daily production falls below 0, thus decreases, this is an indication of illness of the dairy animal. When this is detected, the switching will be prevented and the routine for switching will have to be started again and/or a period of rest of a number of milkings or a number of days stored for that dairy animal in the milking data stored in memory 122 can be recorded and an adapted milking frequency, in particular a milking frequency of 0, can be established for that dairy animal.

Thus, the invention has been described by reference to certain embodiments discussed above. It will be recognized that these embodiments are susceptible to various modifications and alternative forms well known to those of skill in the art. For example, it is also possible to further extend the control unit 9 according to FIG. 4 with a plurality of memories and/or the memories 124, 125, 122, 123 can also be added to form one large memory in which all data are stored. The memory can be designed as a permanent memory, such as a ROM or RAM storage and/or a hard disc or other memory means that is suitable for data storage. The arrangement of the stored data can take place according to the control system of the central calculation unit. In a preferred embodiment, there is used a table that is readable by a user, in a format that is readable by a user, such as a word processing program, such as MS Word.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of controlling a milking device, comprising a milking unit which is provided with at least one teat cup that is connectable to a teat of a dairy animal, wherein the method comprises:
    providing a milking frequency determined in a first manner, associated with a first lactation phase, and providing a milking frequency determined in a second, different manner, associated with a later, second lactation phase, wherein the first and the second lactation phase are, the stimulation phase and the stable phase, respectively, of the lactation period of a dairy animal, wherein the first manner results in a higher milking frequency than the second manner in the same circumstances,
    identifying a dairy animal and determining the milking frequency associated with the identified dairy animal,
    milking the identified dairy animal with the milking unit in dependence on the determined milking frequency,
    determining the milk production of the dairy animal,
    forming a first parameter representative of a change in the milk production of the identified dairy animal, wherein the change in milk production is a change per a predetermined unit of time,
    providing a first threshold value, and
    switching from the first lactation phase to the second lactation phase, wherein the switching occurs once the first parameter reaches the first threshold value.

2. The method according to claim 1, wherein the milking frequencies in at least one of the first manner and the second manner is calculated in dependence on the determined milk production.

3. The method according to claim 1, wherein the parameter is a progressive daily average milk production.

4. The method according to claim 1, wherein the method further comprises storing the parameter, and switching from the first lactation phase to the second lactation phase on the basis of the stored parameter.

5. The method according to claim 1, wherein the parameter is a time-derivative value of the milk production.

6. The method according to claim 1, wherein the threshold value is provided and wherein the switching depends on the threshold value in combination with an increase in a progressive average milk production.

7. The method according to claim 1, wherein the switching depends on the determined milk production during a number of milkings.

8. The method according to claim 1, wherein a second parameter representative of the milk production in connection with an identification of the dairy animal is formed, wherein a second threshold value is provided and wherein the switching is prevented in dependence on the change in the determined milk production as well as the second parameter, if said difference reaches the second threshold value.

9. The method according to claim 8, wherein preventing the switching further comprises providing a progressive average daily production for the dairy animal and preventing the switching if the progressive average daily production has decreased.

10. The method according to claim 8, wherein the second parameter is representative of a change in the milk production of the identified dairy animal, wherein the change in milk production is a change per a predetermined unit of time, and wherein the second threshold value represents a greater change in comparison to the first threshold value.

11. The method according to claim 1, wherein the switching occurs once the first parameter falls to reach the first threshold value.

12. A milking device comprising a milking unit that is provided with at least one teat cup and with a connecting unit for connecting the teat cup to a teat of a dairy animal, wherein the milking device further comprises a measuring sensor which issues a measurement signal representative of a milk production, an identification unit for enabling the identification of an individual dairy animal, and a control unit, wherein the control unit is connected to the measuring sensor, wherein the control unit is configured to determine a milking frequency in a first manner, associated with a first lactation phase, and in a second, different manner, associated with a later, second lactation phase, wherein the first and the second lactation phase are the stimulation phase and the stable phase of the lactation period of the dairy animal, and wherein the first manner results in a higher milking frequency than the second manner in the same circumstances, wherein the control unit is connected to a memory in which a threshold value is stored, wherein the control unit is configured to milk the identified dairy animal with the milking unit in dependence on change in milk production, wherein the change in milk production is a change per a predetermined unit of time and wherein the threshold value is a threshold for the change per unit time, wherein the control unit is further configured to switch from determining the milking frequency in the first manner to determining the milking frequency in the second manner for the identified dairy animal in dependence on the threshold value from the memory.

13. The milking device according to claim 12, wherein the milking device comprises a working memory for collecting milking data based on the measurement signal for the milk production in connection with an identification for the identified dairy animal, wherein the working memory is connected to the control unit.

14. The milking device according to claim 12, wherein the control unit is configured to switch in dependence on a threshold value in combination with an increase in a progressive average milk production during a number of milkings.

15. The milking device according to claim 12, wherein the connecting unit is mounted on a robot arm.

16. The milking device according to claim 12, wherein the milking device comprises an animal space which is provided with a controllable entrance connected to the control unit, wherein the entrance is accessible in dependence on the determined milking frequency of the identified dairy animal.

17. The milking device according to claim 12, wherein a parameter representative of the milk production in connection with an identification of the dairy animal can be stored in a memory and wherein the control unit is further configured to prevent switching from the first lactation phase to the second lactation phase in dependence on a difference between the determined milk production and an earlier determined stored milk production for the identified dairy animal.

18. The milking device according to claim 17, wherein a second threshold value is stored in a memory, and wherein the control unit is configured to prevent the switching if said difference is greater than the second threshold value.

19. The milking device according to claim 18, wherein the control unit is further configured to prevent the switching in dependence on a decrease of a progressive average daily production for the identified dairy animal.

20. The milking device according to claim 12, wherein the control unit is further configured to switch from the first lactation phase to the second lactation phase for the identified dairy animal when the change in milk production falls below the threshold value.

* * * * *